US00RE34126E

United States Patent [19]

Todd

[11] E Patent Number: Re. 34,126

[45] Reissued Date of Patent: Nov. 17, 1992

[54] BOW STRING RELEASE

[76] Inventor: Gary J. Todd, 33551 Giftos, Mt. Clemens, Mich. 48043

[21] Appl. No.: 625,447

[22] Filed: Dec. 11, 1990

Related U.S. Patent Documents

Reissue of:

[64] Patent No.: 4,403,594
Issued: Sep. 13, 1983
Appl. No.: 332,470
Filed: Dec. 21, 1981

[51] Int. Cl.[5] ..... F41B 5/00
[52] U.S. Cl. ..... 124/35.2
[58] Field of Search ..... 14/31, 35.1, 35.2, 23.1, 14/86, 90

[56] References Cited

U.S. PATENT DOCUMENTS

| | | | |
|---|---|---|---|
| 3,948,243 | 4/1976 | Gazzara, Sr. | 124/35.2 |
| 4,041,926 | 8/1977 | Troncoso, Jr. et al. | 124/35.2 |
| 4,134,369 | 1/1979 | Cook | 124/35.2 |
| 4,141,117 | 2/1979 | Van Gompel | 24/136 A X |
| 4,160,437 | 7/1979 | Fletcher | 124/35.2 |
| 4,476,845 | 10/1984 | Rickard | 124/35.2 |

OTHER PUBLICATIONS

Archery World, Apr./May 1979 Issue, p. 61.
Arcery World, May 1980 Issue, p. 70.
Undated Publication of RUTR Rickard Release.
8 Photographs of "The Richard 4-Mode Bowstring Release".
3 Page Document showing 4 Photographs and 2 pages of Instructions of RUTR Single Page document of "The Rickard 4-Mode Bowstring Release".
The Missileer (undated) p. 6.

*Primary Examiner*—Randolph A. Reese
*Assistant Examiner*—Jeffrey L. Thompson
*Attorney, Agent, or Firm*—Charles W. Chandler

[57] ABSTRACT

A release device for pulling the midsection of a bow string, the device having a slot for receiving the bow string, and a pair of balls that engage one another to close the slot to retain the box string until such time as the user manipulates a trigger to permit separation of the balls and release the bow string.

5 Claims, 1 Drawing Sheet

BOW STRING RELEASE

Matter enclosed in heavy brackets [ ] appears in the original patent but forms no part of this reissue specification; matter printed in italics indicates the additions made by reissue.

BACKGROUND OF THE INVENTION

This invention is related to archery bow string release devices, and more particularly to such a device that employs a pair of balls for retaining the bow string between them as the bow is being bent.

Bow string release devices are known in the prior art for enabling an archer to pull a bow string to bend the bow. The device is either held in his hand or strapped to his wrist, and has a trigger which permits him to release the string. Typically such devices employ a pivotal finger that engages the bow string, the finger being pivoted to a release position for releasing the string. Such devices are illustrated in U.S. Pat. No. 4,066,060 to Napier; U.S. Pat. No. 3,898,974 which issued to Keck and U.S. Pat. No. 3,954,095 which issued to Lewis.

The problem with commercially-available release devices is that as the release finger is pivoted it produces a lateral bias on the bow string thereby reducing the accuracy of the arrow's trajectory. In addition such release devices are relatively noisy.

SUMMARY OF THE INVENTION

The broad purpose of the present invention is to provide a bow string release device having a pair of balls for retaining the string between them, with trigger-operated means permitting separation of the balls when the user manipulates a trigger. As the balls are separated by the tension on the string, they provide a minimal, frictional, engagement with the string, and provides a quiet release. The balls do not produce a lateral bias on the string thereby providing a more accurate arrow trajectory.

Still further objects and advantages of the present invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views and in which.

DESCRIPTION OF THE PREFERRED EMBODIMENT

Figure 1:
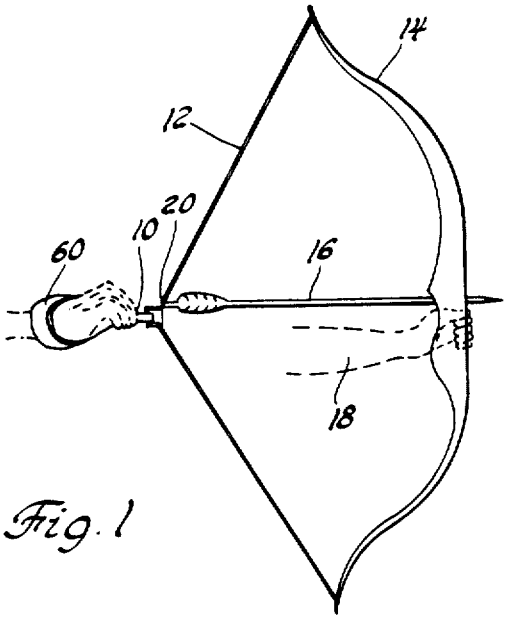
FIG. 1 illustrates a preferred bow string release device used to bend a conventional bow.

Referring to the drawings, FIG. 1 shows a release device 10 illustrating the preferred embodiment of the invention engaging bow string 12 of a conventional archery bow 14. An arrow 16 is mounted on the bow by user 18, the nock 20 of the arrow being engaged with bow string 12. Referring to FIGS. 2 to 5, release device 10 comprises an elongated body member 22 having a raised portion 24. Body 22 is generally elongated and has a slot 26 for receiving bow string 12.

A sleeve 30 is slideably mounted on the body. The sleeve has a pair of openings 32 and 34 adjacent the ends of slot 26, as best illustrated in FIG. [5] *3. Slot 34 is larger than slot 32 in order to accomodate the nock of an arrow.* The sleeve has a slot 36 which permits it to move on the body with respect to raised portion 24.

Figure 3:
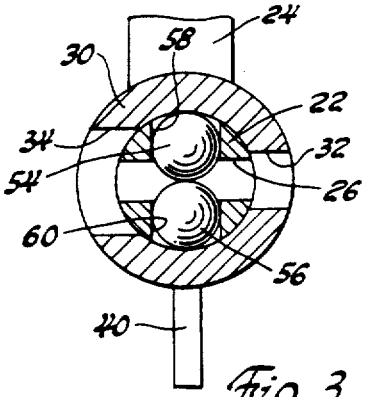
FIG. 3 is a view seen along the lines 3—3 of FIG. 2.
Figure 2:
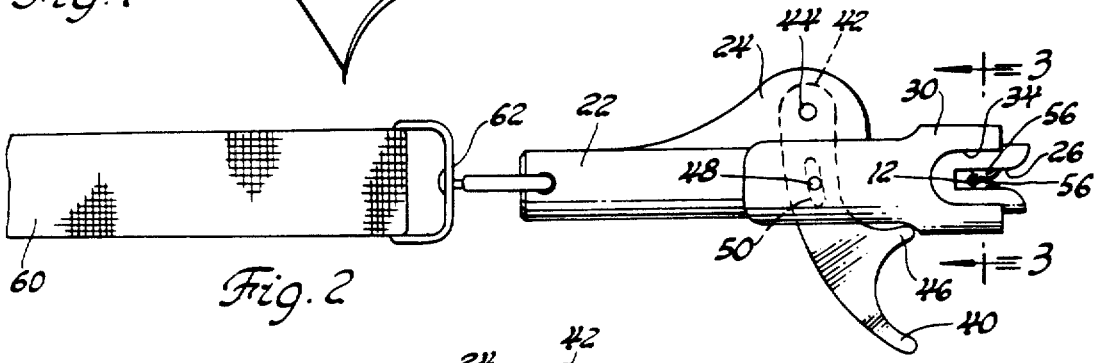
FIG. 2 is an enlarged, plan view of the release device of FIG. 1.
Figure 4:
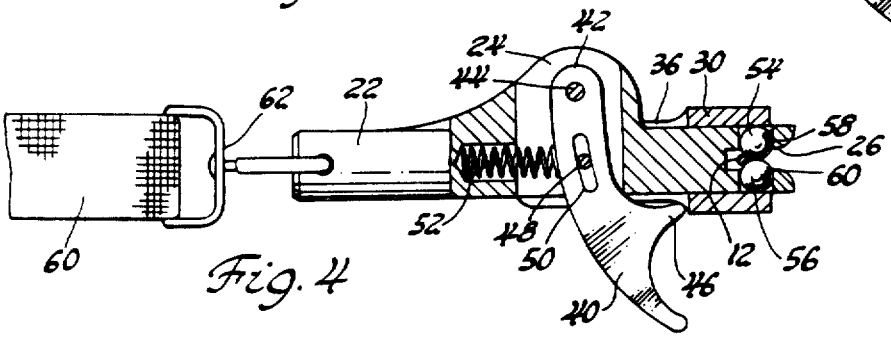
FIG. 4 is a view similar to FIG. 2 but in which the release device is shown in section.
Figure 5:
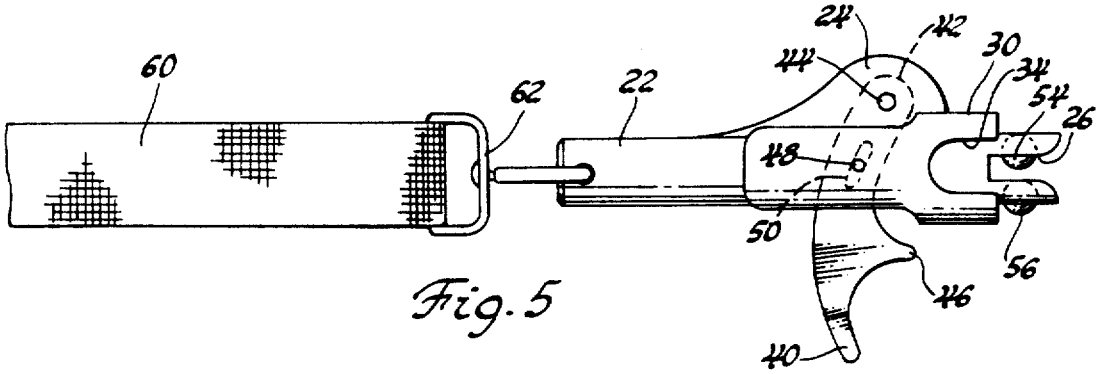
FIG. 5 is a view similar to FIG. 2, but is showing the device in its release position.

A trigger member 40 has an upper finger 42 connected by pin 44 to raised portion 24 so that the lower end of the trigger can be manipulated by the user's finger. The trigger has a lower finger 46 which engages sleeve 30, as best illustrated in FIG. 3, to define the string-retaining position of the trigger. A pin 48, carried by sleeve 30, is received in a slot 50 in the trigger to connect it to the sleeve in such a manner that as the trigger is moved toward a release portion, illustrated in FIG. 5, the sleeve is moved toward raised portion 24. A spring 52 is mounted in the body to bias the trigger toward its string-retaining position.

A pair of balls 54 and 56 are trapped in openings 58 and 60 respectively, formed in the body on opposite sides of slot 26. As best illustrated in FIG. 3, the combined diameters of the two balls is approximately the same as the diameter of body 22. Thus, when sleeve 30 is moved toward its string-retaining position, illustrated in FIG. 3, both balls are disposed closely adjacent one another to form a barrier in the slot preventing bow string 12 from passing between the balls. The balls have sufficient clearance in their respective openings so that when sleeve 30 is moved rearwardly by trigger 40 the balls are separated by the string's tension to permit passage of the string.

A wrist strap 60 is connected by swivel fastener 62 to the rearward end of body 22. The rear end of body 22 functions as a handle so that the user can partially grasp the body in his fingers. Strap 60 is adapted to be wrapped around his wrist so that by pulling on the strap he can pull the release member and the bow string to bend the bow, as illustrated in FIG. 1.

In use, the user wraps strap 60 around his wrist, pulls trigger 40 to release the balls, inserts the bow string in slot 26 behind the balls and then releases the trigger so that sleeve 30 locks the balls in position so that the bow string is trapped behind the balls. He then pulls on the release device to bend the bow in the conventional manner. When he has applied sufficient tension on the bow string and aims arrow 16, he then pulls trigger 40 until the balls release the bow string.

It is to be noted that the bow string is retained between the two balls which eliminates any lateral bias on the string when it is released. In addition, the balls provide a very quiet release as well as a minimal amount of friction on the bow string.

Having described my invention, I claim:

[1. A bow string release device comprising:

a body having a slot for receiving a bow string;

a pair of balls mounted in said body on opposite sides of the slot, said balls being relatively movable from a first position in which they are adjacent one another and engage the bow string to prevent removal thereof from said slot, toward a second position in which they permit passage of the bow string therebetween;

a release member comprising a sleeve having an opening, the body being slideably mounted in the opening for movement between a string-retaining position in which the slot in the body is disposed within the sleeve to prevent movement of the balls from said first position, and a release position in which the slot in the body extends beyond the sleeve permitting movement of the balls toward said second position; and means connected to the release member for moving it from the string-retaining position to the release position as at such times as said pair of balls are engaged with a bow string.]

2. A bow string release device comprising:

a body having a slot for receiving a bow string;

a pair of balls mounted in said body on opposite sides of the slot, said balls being relatively movable from a first position in which they are adjacent one another and engage the bow string to prevent removal thereof from said slot, toward a second position in which they permit passage of the bow string therebetween;

a release member mounted on the body so as to be movable between a string-retaining position in which it prevents movement of the balls from said first position, and a release position permitting movement of the balls toward said second position;

means connected to the release member for moving it from the string-retaining position to the release position at such times as said pair of balls are engaged with a bow string; and [;]

including a trigger member pivotally connected to the body and engaged with the release member in such a manner that as the trigger member is moved from a first trigger position toward a second trigger position, the release member is moved from the string-retaining position towards the release position; *and*

*said release member being slidably mounted relative to said body for linear movement therealong; said trigger member having a cam which applies a positive force to said release member when the trigger member is moved from said first trigger position to said second trigger position for causing the release member to move linearly along said body to the release position; and*

*spring means located within said body for simultaneously biasing said trigger member to said first trigger position and said release member to its string-retaining position.*

3. A bow string release device comprising:

a body having a slot for receiving a bow string;

a pair of balls mounted in said body on opposite sides of the slot, said balls being relatively movable from a first position in which they are adjacent one another and engage the bow string to prevent removal thereof from said slot, toward a second position in which they permit passage of the bow string therebetween;

a release member mounted on the body so as to be movable between a string-retaining position in which it prevents movement of the balls from said first position, and a release position permitting movement [ov] *of* the balls toward said second position;

means connected to the release member for moving it from the string-retaining position at such times as said pair of balls are engaged with a bow string; and in which the release member comprises a sleeve slideably mounted on the body and having a pair of openings disposed in alignment on opposite sides of the slot in the body at such times as the release member is disposed in said string-retaining position, one of the slots in the sleeve member being larger than the other slot to accomodate the nock of an arrow.

*4. A bow string release device as defined in claim 2, wherein said cam engagement with said release member cams the release member to move linearly along said body to said release position; and*

*said bow string release device further comprising:*

*said body being elongated, the slot being disposed at one end of the body;*

*handle means connected to the opposite end of the body relative to said slot;*

*the pair of balls being disposed adjacent one another in the string-retaining position, but being movable in a lateral direction with respect to the direction of motion of the release member on the body;*

*the release member comprising a sleeve-like member, linearly, slideably movable along the body in either a first direction toward the slot, or in the opposite direction, toward the handle means; and*

*first structure carried by the sleeve-like member and movable therewith, the first structure having a pair of abutments spaced in said lateral direction a distance at least as great as the combined diameters of the pair of balls and located on opposite sides of the pair of balls to prevent separation of the pair of balls a distance sufficient to pass the bow string between them when the release member is in said string-retaining position.*

*5. A bow string release device as defined in claim 4, and in which said first structure is moved toward the handle means as the trigger member is being moved toward the second trigger position.*

*6. A bow string device as defined in claim 4, and in which said trigger member has a cam slot and said release member has a pin extending transversely through the cam slot, said cam slot and pin forming a cam connection for achieving the said cam engagement between the trigger member and the release member.*

* * * * *